(12) United States Patent
Konishi et al.

(10) Patent No.: US 6,678,124 B2
(45) Date of Patent: Jan. 13, 2004

(54) MAGNETIC RECORDING AND REPRODUCTION APPARATUS

(75) Inventors: Akio Konishi, Hyogo (JP); Koichiro Hirabayashi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 83 days.

(21) Appl. No.: 10/142,021

(22) Filed: May 9, 2002

(65) Prior Publication Data

US 2002/0191347 A1 Dec. 19, 2002

(30) Foreign Application Priority Data

Jun. 4, 2001 (JP) ........................................ 2001-167981

(51) Int. Cl.[7] ............................................... G11B 21/04
(52) U.S. Cl. ................................................... 360/271.6
(58) Field of Search ........................... 360/271.6, 271.1

(56) References Cited

U.S. PATENT DOCUMENTS 5,875,168 A * 2/1999 Ogusu et al. ............... 369/247

* cited by examiner

*Primary Examiner*—George J. Letscher
(74) *Attorney, Agent, or Firm*—Renner, Otto, Boisselle & Sklar

(57) ABSTRACT

A magnetic recording and reproduction apparatus for recording and reproducing a signal to and from a magnetic tape includes a substrate having first and second positioning engagement holes; a rotation head cylinder provided on the substrate and having the magnetic tape wound therearound over a prescribed angle and having first and second female screws; a first attaching screw having a first cylindrical section for insertion into the first positioning engagement hole and engagement with the first female screw; and a second attaching screw having a second cylindrical section for insertion into the second positioning engagement hole and engagement with the second female screw. Diameters A1 and A2 of the first and second cylindrical sections and diameters B1 and B2 of the first and second positioning engagement holes fulfill the following relationships:

0.0002 mm<B1–A1<0.1 mm, and 0.0002 mm<B2–A2<0.1 mm.

14 Claims, 11 Drawing Sheets

(PRIOR ART)

(PRIOR ART)

MAGNETIC RECORDING AND REPRODUCTION APPARATUS

BACKGROUND OF THE INVENTION

1. Field of the Invention

The present invention relates to a magnetic recording and reproduction apparatus for performing recording and reproduction of signals to or from a magnetic tape which is wound around a rotation head cylinder of the magnetic recording and reproduction apparatus.

2. Description of the Related Art

FIG. 11 is a plan view of a conventional magnetic recording and reproduction apparatus 100. As shown in. FIG. 11, the magnetic recording and reproduction apparatus 100 includes a substrate 1 and a rotation head cylinder 2 attached to a cylinder attachment section 3 of the substrate 1.

FIG. 12 is a plan view of the substrate 1. The substrate 1 has a first through-hole 4 having a diameter C1, a second through-hole 5 having a diameter C2, a first positioning pin 6 having a diameter D1 and pressure-inserted into the substrate 1, and a second positioning pin 7 having a diameter D2 and pressure-inserted into the substrate 1.

FIG. 13 is a bottom view of the rotation head cylinder 2. The cylinder 2 has a first female screw 8, a second female screw 9, a first positioning hole 10 and a second positioning hole 11. The first positioning hole 10 is circular and has a diameter E1. The second positioning hole is substantially slot-shaped and has a width E2.

FIG. 16 is a cross-sectional view of the conventional magnetic recording and reproduction apparatus 100 taken along line H—H in FIG. 11. As shown in FIG. 16, the rotation head cylinder 2 is attached to the substrate 1 via a first attaching screw 22 inserted Into the through-hole 4 of the substrate 1 and a second attaching screw 25 inserted into the through-hole 5 of the substrate 1.

FIG. 14 is a side view of the first attaching screw 22. The first attaching screw 22 includes a (first) cylindrical section 23 having a diameter A1 and a (first) male screw 24 projecting from the first cylindrical section 23. FIG. 15 is a side view of the second attaching screw 25. The second attaching screw 25 includes a (second) cylindrical section 26 having a diameter A2 and a (second) male screw 27 protecting from the second cylindrical section 26.

Returning to FIG. 16, the first attaching screw 22 is inserted into the through-hole 4 of the substrate 1, so that the first male screw 24 is engaged with the first female screw 8 of the rotation head cylinder 2. A coil spring 14$a$, interposed between a head of the first attaching screw 22 and the substrate 1, loads the first attaching screw 22 in such a direction as to pressure-contact the rotation head cylinder 2 to the substrate 1. Likewise, the second attaching screw 25 is inserted into the through-hole 5 of the substrate 1, so that the second male screw 27 is engaged with the second female screw 9 of the rotation head cylinder 2. A coil spring 14$b$, interposed between a head of the second attaching screw 25 and the substrate 1, loads the second attaching screw 25 in such a direction as to pressure-contact the rotation cylinder 2 to the substrate 1.

FIG. 17 is a cross-sectional view of the conventional magnetic recording and reproduction apparatus 100 taken along line I—I in FIG. 11. The first positioning pin 6 is engaged with the first positioning hole 10, and the second positioning pin 7 is engaged with the second positioning hole 11. In general, relationships of the sizes of the pins, screws and holes are set as follows.

$$0.0002 \text{ mm} < E1-D1 < 0.1 \text{ mm}$$

$$0.0002 \text{ mm} < E2-D2 < 0.1 \text{ mm}$$

$$0.1 \text{ mm} \leq C1-A1$$

$$0.1 \text{ mm} \leq C2-A2$$

Therefore, the positioning precision of the rotation head cylinder 2 on the substrate 1 required for reliable operation of the conventional magnetic recording and reproduction apparatus is determined by the relationship in size between the first positioning pin 6 and the first positioning hole 10, and the relationship in size between the second positioning pin 7 and the second positioning hole 11. The first cylindrical section 23 and the first through-hole 4 have a gap therebetween, and the second cylindrical section 25 and the second through-hole 5 have a gap therebetween. Therefore, the first and second attaching screws 22 and 25 and the first and second through-holes 4 and 5 do not influence the positioning precision.

As described above, the conventional magnetic recording and reproduction apparatus 100 requires two positioning pins 6 and 7 in correspondence with two positioning holes 10 and 12 in order to provide a positioning precision of the rotation head cylinder 2 to the substrate 1. Such an arrangement undesirably complicates the structure of the magnetic recording and reproduction apparatus. Furthermore, since a large number of elements are required to be precisely positioned relative to each other, there is a high possibility of imprecise positioning of the rotation head cylinder 2.

SUMMARY OF THE INVENTION

According to one aspect of the invention, a magnetic recording and reproduction apparatus for recording and reproducing a signal to and from a magnetic tape includes a substrate having a first positioning engagement hole and a second positioning engagement hole; a rotation head cylinder provided on the substrate and having the magnetic tape wound therearound over a prescribed angle, the rotation head cylinder having a first female screw and a second female screw; a first attaching screw having a first cylindrical section for insertion into the first positioning engagement hole and engagement with the first female screw; and a second attaching screw having a second cylindrical section for insertion into the second positioning engagement hole and engagement with the second female screw. The first cylindrical section has a diameter A1, the first positioning engagement hole has a diameter B1, the second cylindrical section has a diameter A2, and the second positioning engagement hole has a width B2, and A1, A2, B1 and B2 fulfill the following relationships:

$$0.0002 \text{ mm} < B1-A1 < 0.1 \text{ mm,}$$

and $$0.0002 \text{ mm} < B2-A2 < 0.1 \text{ mm.}$$

According to another aspect of the invention, a magnetic recording and reproduction apparatus for recording and reproducing a signal to and from a magnetic tape includes a substrate having a first positioning engagement hole and a second positioning engagement hole; a rotation head cylinder provided on the substrate and having the magnetic tape wound therearound over a prescribed angle, the rotation head cylinder having a first female screw and a second female screw; a first attaching screw having a first male screw for insertion into the first positioning engagement hole and engagement with the first female screw; and a second attaching screw having a second male screw for insertion into the second positioning engagement hole and engagement with the second female screw. The first male screw has a diameter A1, the first positioning engagement hole has a diameter B1, the male screw has a diameter A2, and the second positioning engagement hole has a width B2, and A1, A2, B1 and B2 fulfill the following relationships:

$$0.0002 \text{ mm} < B1-A1 < 0.1 \text{ mm},$$

and $$0.0002 \text{ mm} < B2-A2 < 0.1 \text{ mm}.$$

In one embodiment of the invention, one of the first and second positioning engagement holes is circular and the other of the first and second positioning engagement holes is substantially slot-shaped.

In one embodiment of the invention, the magnetic recording and reproduction apparatus further includes a third attaching screw for insertion into a third positioning engagement hole of the substrate.

In one embodiment of the invention, the third attaching screw has a clearance equal to or greater than 0.1 mm when inserted into the third positioning engagement hole.

In one embodiment of the invention, a first coil spring is provided between a head of the first attaching screw and the substrate and a second coil spring is provided between a head of the second attaching screw and the substrate, the first and second coil springs respectively loading the first and second attaching screws in a direction so as to pressure-contact the rotation head cylinder to the substrate.

In one embodiment of the invention, the substrate further has an assembly projection for insertion into an assembly hole of the rotation head cylinder.

In one embodiment of the invention, the assembly projection has a clearance equal to or greater than 0.1 mm when inserted into the assembly hole.

Thus, the invention described herein makes possible the advantages of providing a magnetic recording and reproduction apparatus in which the positioning of a rotation head cylinder on a substrate is achieved with a sufficiently high level of precision while providing a simple structure.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
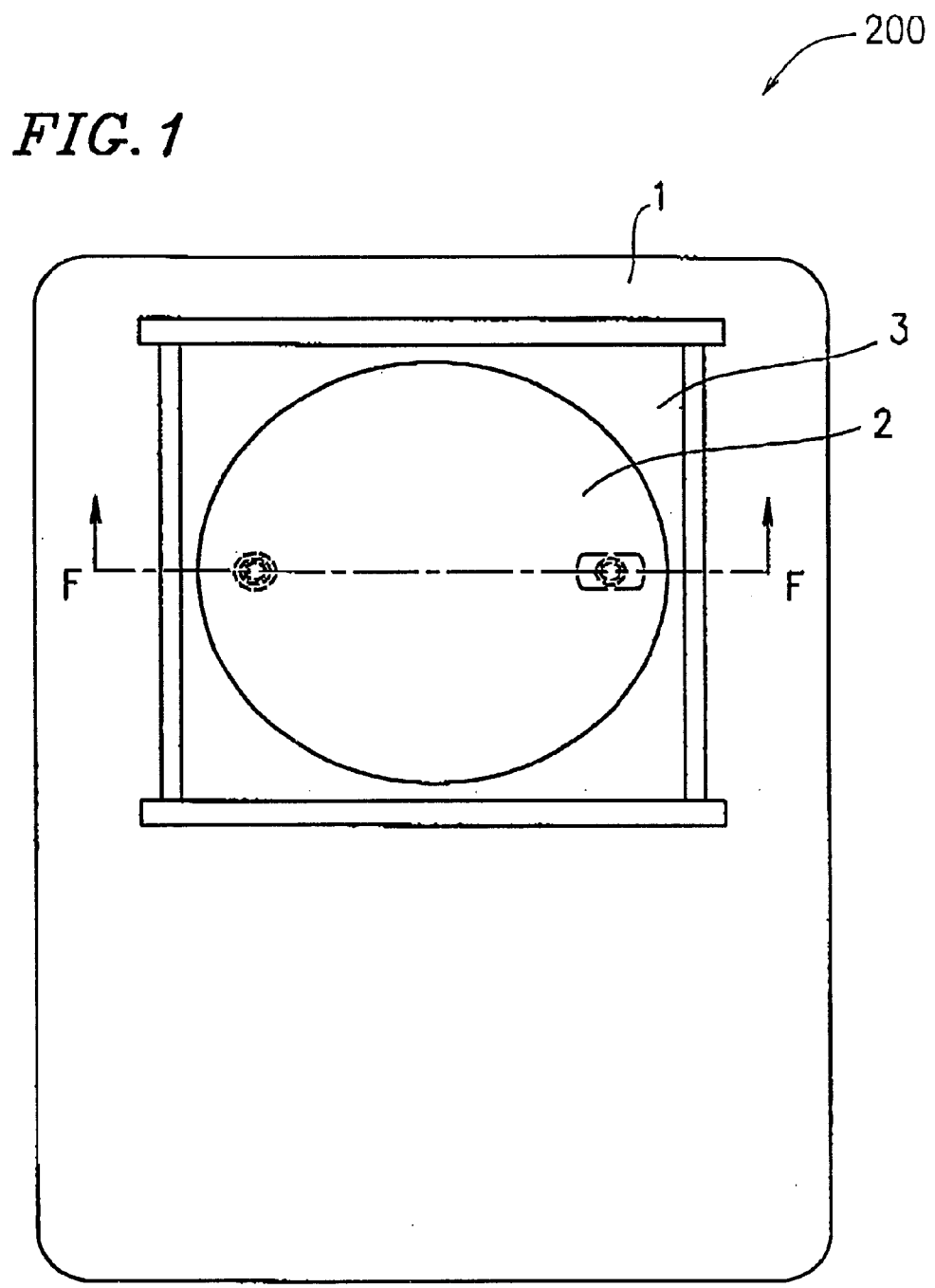
FIG. 1 is a plan view of a magnetic recording and reproduction apparatus according to a first example of the present invention.

FIG. 1 is a plan view of a magnetic recording and reproduction apparatus 200 according to a first example of the present invention. As shown in FIG. 1, the magnetic recording and reproduction apparatus 200 includes a substrate 1 and a rotation head cylinder 2 attached to a cylinder attachment section 3 of the substrate 1.

Figure 2:
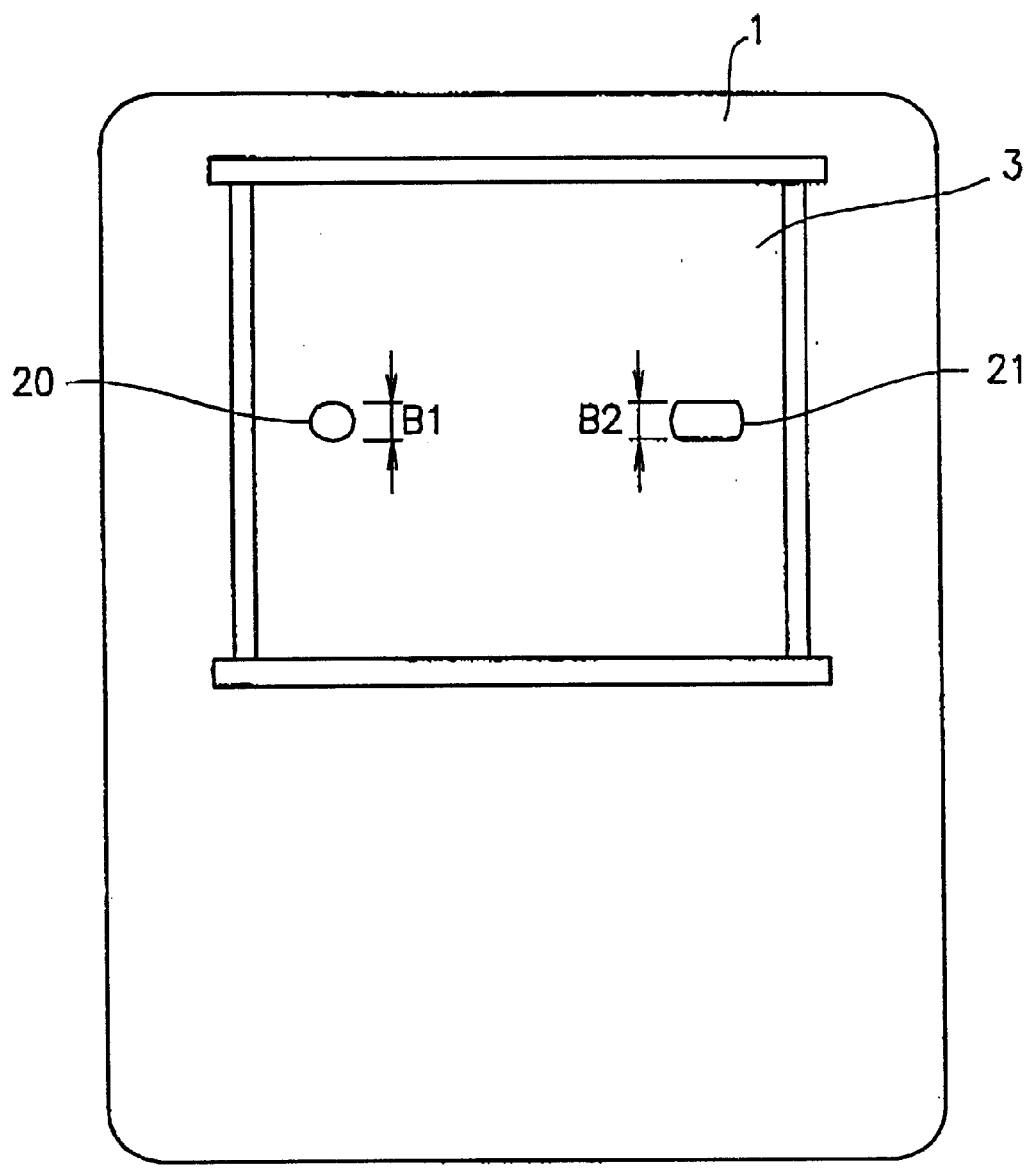
FIG. 2 is a plan view of a substrate of the magnetic recording and reproduction apparatus shown in FIG. 1.

FIG. 2 is a plan view of the substrate 1. The substrate 1 has a first positioning engagement hole 20 and a second positioning engagement hole 21. The first positioning engagement hole 20 is circular and has a diameter B1. The second positioning engagement hole 21 is substantially slot-shaped and has a width B2.

Figure 3:
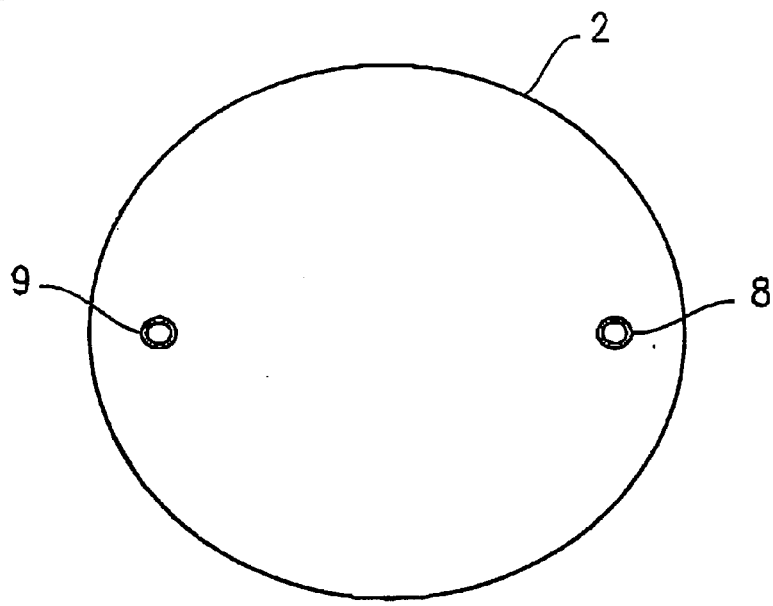
FIG. 3 is a bottom view of a rotation head cylinder of the magnetic recording and reproduction apparatus shown in FIG. 1.

FIG. 3 is a bottom view of the rotation head cylinder 2. The cylinder 2 has a first female screw 8 and a second female screw 9.

Figure 6:
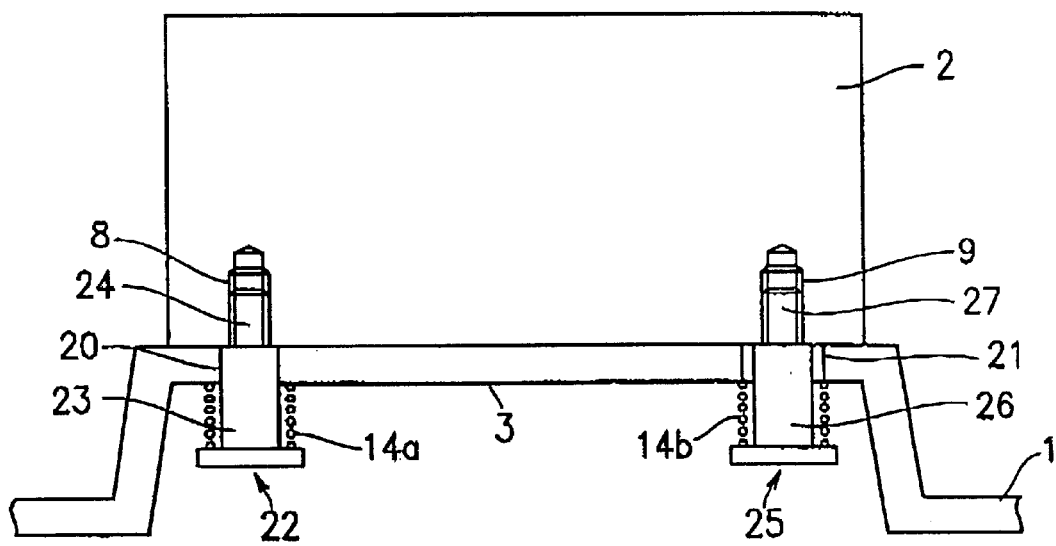
FIG. 6 is a cross-sectional view of the magnetic recording and reproduction apparatus taken along line F—F in FIG. 1.

FIG. 6 is a cross-sectional view of the magnetic recording and reproduction apparatus 200 taken along line F—F in FIG. 1. As shown in FIG. 6, the rotation head cylinder 2 is attached to the substrate 1 via a first attaching screw 22 inserted into the first positioning engagement hole 20 of the substrate 1 and a second attaching screw 25 inserted into the second positioning engagement hole 21 of the substrate 1.

Figure 4:
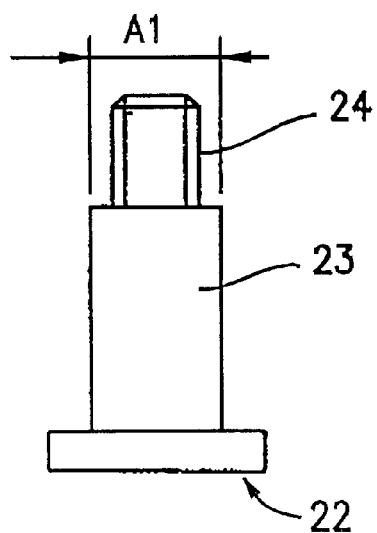
FIG. 4 is a side view of a first attaching screw used to attach the rotation head cylinder to the substrate of the magnetic recording and reproduction apparatus shown in FIG. 1.
Figure 5:
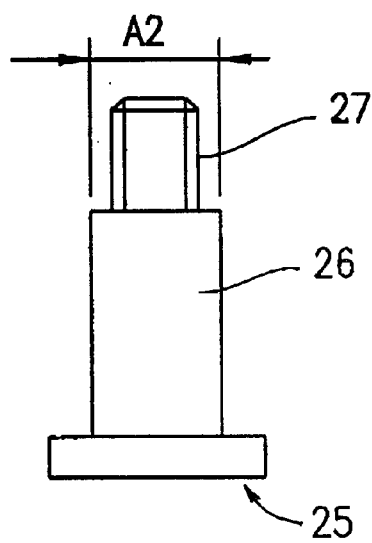
FIG. 5 is a side view of a second attaching screw used to attach the rotation head cylinder to the substrate of the magnetic recording and reproduction apparatus shown in FIG. 1.

FIG. 4 is a side view of the first attaching screw 22. The first attaching screw 22 includes a (first) cylindrical section 23 having a diameter A1 and a (first) male screw 24 projecting from the first cylindrical section 23. FIG. 5 is a side view of the second attaching screw 25. The second attaching screw 25 includes a (second) cylindrical section 26 having a diameter A2 and a (second) male screw 27 projecting from the second cylindrical section 26.

Returning to FIG. 6, the first attaching screw 22 is inserted through the first positioning engagement hole 20 of the substrate 1, so that the first male screw 24 is engaged with the first female screw 8 of the rotation head cylinder 2. A (first) coil spring 14a, interposed between a head of the first attaching screw 22 and the substrate 1, loads the first attaching screw 22 in such a direction as to pressure-contact the rotation head cylinder 2 to the substrate 1. Likewise, the second attaching screw 25 is inserted through the second positioning engagement hole 21 of the substrate 1, so that the second male screw 27 is engaged with the second female screw 9 of the rotation head cylinder 2. A (second) coil spring 14b, interposed between a head of the second attaching screw 25 and the substrate 1, loads the second attaching screw 25 in such a direction to pressure-contact the rotation cylinder 2 to the substrate 1.

Generally in a magnetic recording and reproduction apparatus, the rotation head cylinder needs to be positioned relative to the substrate in a predetermined position with a high level of precision so as to provide reliable operation of the apparatus. The DV (digital video) Standards are provided for magnetic recording and reproduction apparatuses of systems in which a rotatable head disposed on a rotation head cylinder helically scans a magnetic tape. According to the DV Standards, a magnetic tape having a width of 6.35 mm is wound around a rotation head cylinder having a diameter of 21.7 mm over 174 degrees. The rotation head cylinder is inclined at 9.15 degrees with respect to the substrate. When the rotation head cylinder rotates at 9000 rev/min and the magnetic tape runs at a speed of 18.83 mm/sec so as to record/reproduce a signal to/from the magnetic tape, the linearity of the running locus of a rotation head with respect to the magnetic tape needs to be within 0.003 mm. In the first example, the positioning precision of the rotation head cylinder 2 on the substrate 1 with respect to the above DV Standards is determined by the relationships between A1, A2, B1 and B2.

Table 1 shows the relationship between A1 and B1, and the evaluation of the linearity of the running locus of the rotation head with respect to the magnetic tape. Table 2 shows the relationship between A2 and B2, and the evaluation of the linearity of the running locus of the rotation head with respect to the magnetic tape.

TABLE 1

| Relationship between A1 and B1 | Evaluation |
|---|---|
| $0 \leq B1 - A1 \leq 0.0002$ | Poor |
| $0.0002 < B1 - A1 \leq 0.01$ | Good |
| $0.01 < B1 - A1 \leq 0.05$ | Good |
| $0.05 < B1 - A1 < 0.1$ | Good |
| $0.1 \leq B1 - A1 \leq 0.2$ | Poor |

TABLE 2

| Relationship between A2 and B2 | Evaluation |
|---|---|
| $0 \leq B2 - A2 \leq 0.0002$ | Poor |
| $0.0002 < B2 - A2 \leq 0.01$ | Good |
| $0.01 < B2 - A2 \leq 0.05$ | Good |
| $0.05 < B2 - A2 < 0.1$ | Good |
| $0.1 \leq B2 - A2 \leq 0.2$ | Poor |

In Tables 1 and 2, the relationships of $0 \leq B1-A1 \leq 0.0002$ and $0 \leq B2-A2 \leq 0.0002$ result in the evaluation of "poor" linearity of the running locus. The reason is that the clearance between the first cylindrical section of the first attaching screw and the first positioning engagement hole, and the clearance between the second cylindrical section of the second attaching screw and the second positioning engagement hole, are each too small to allow the first and second cylindrical sections to respectively pass through the first and second positioning engagement holes.

The relationships of $0.1 \leq B1-A1 \leq 0.2$ and $0.1 \leq B2-A2 \leq 0.2$ also result in the evaluation of "poor" linearity of the running locus. The reason is that too high a positioning error of the rotation head cylinder on the substrate results, and as such, the linearity of the locus exceeds 0.003 mm as set by the DV Standards. Accordingly, A1, A2, B1 and B2 are set to have the following relationships.

$$0.0002 \text{ mm} < B1-A1 < 0.1 \text{ mm}$$

$$0.0002 \text{ mm} < B2-A2 < 0.1 \text{ mm}$$

Due to such relationships of A1, A2, B1 and B2, the magnetic recording and reproduction apparatus 200 according to the first example of the present invention includes a rotation head cylinder which is positioned with respect to the substrate of the apparatus with a sufficiently high level of precision to provide reliable operation without requiring dedicated positioning pins or dedicated positioning holes as is conventional.

EXAMPLE 2

Figure 7:
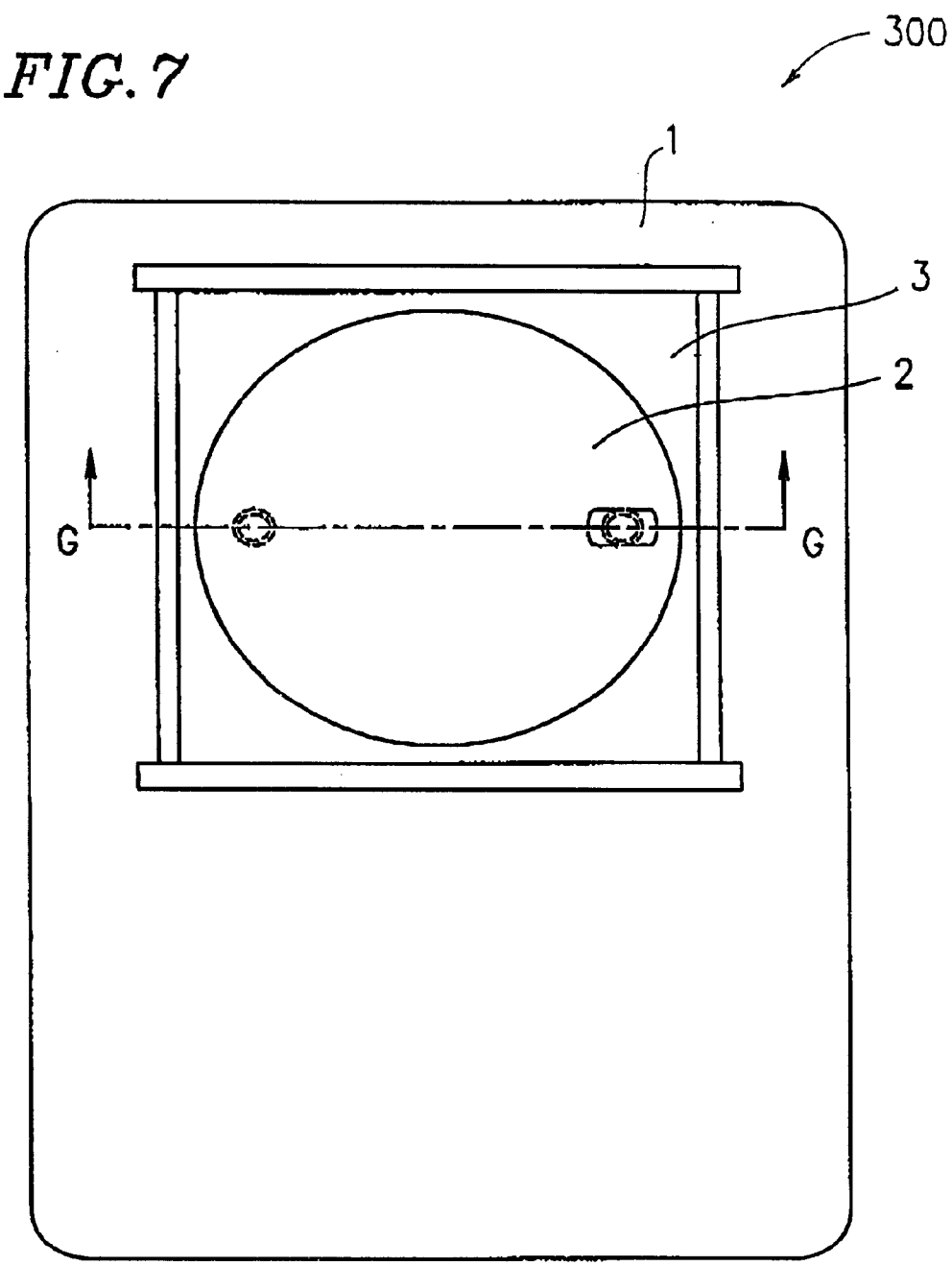
FIG. 7 is a plan view of a magnetic recording and reproduction apparatus according to a second example of the present invention.

FIG. 7 is a plan view of a magnetic recording and reproduction apparatus 300 according to a second example of the present invention. As shown in FIG. 7, the magnetic recording and reproduction apparatus 300 includes a substrate 1 and a rotation head cylinder 2 attached to a cylinder attachment section 3 of the substrate 1.

Figure 10:
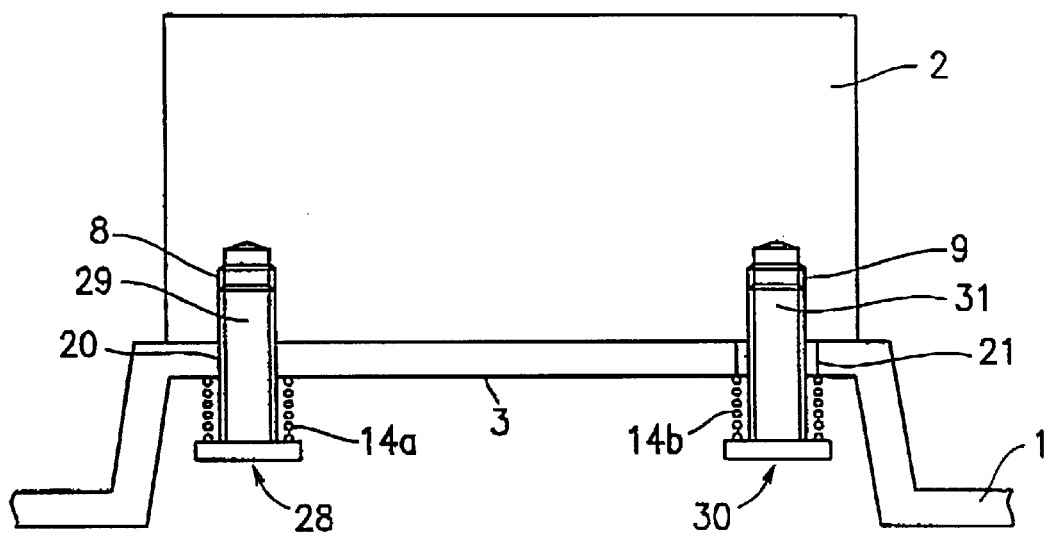
FIG. 10 is a cross-sectional view of the magnetic recording and reproduction apparatus taken along line G—G in FIG. 7.
Figure 11:
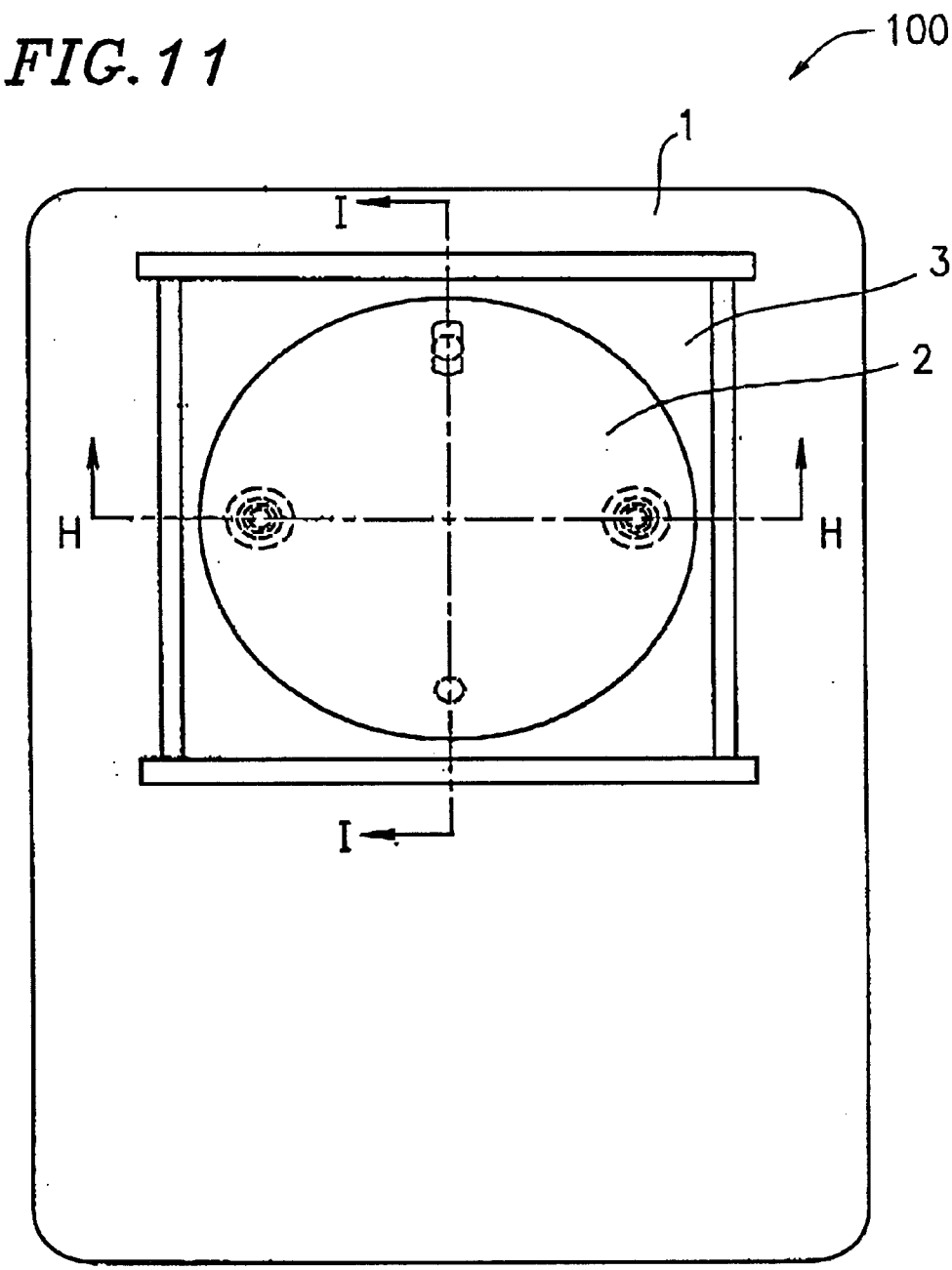
FIG. 11 is a plan view of a conventional magnetic recording and reproduction apparatus.
Figure 12:
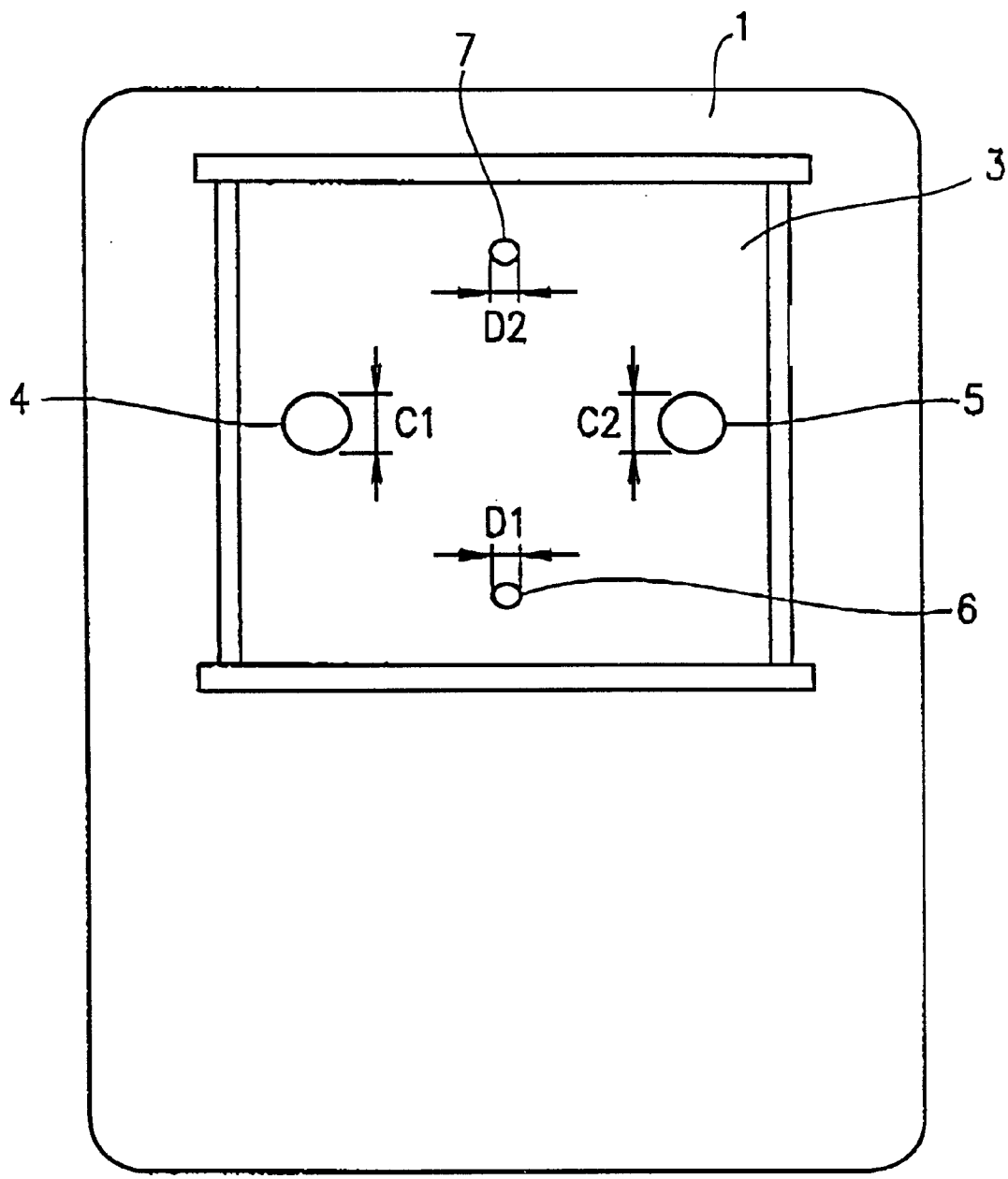
FIG. 12 is a plan view of a substrate of the conventional magnetic recording and reproduction apparatus shown in FIG. 11.
Figure 13:
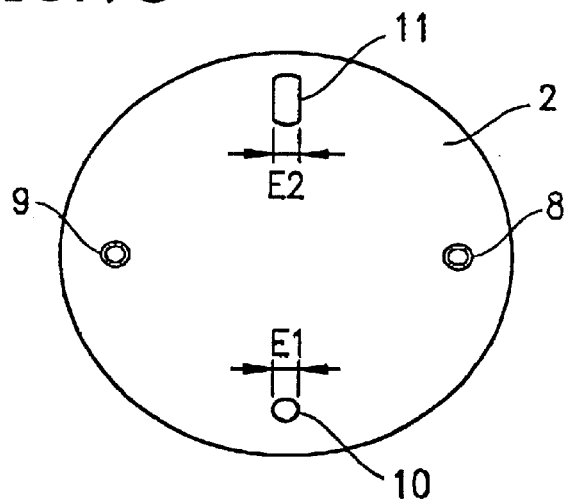
FIG. 13 is a bottom view of a rotation head cylinder of the conventional magnetic recording and reproduction apparatus shown in FIG. 11.
Figure 14:
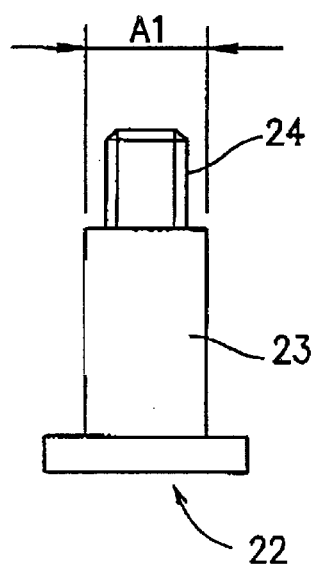
FIG. 14 is a side view of a first attaching screw used to attach the rotation head cylinder to the substrate of the conventional magnetic recording and reproduction apparatus shown in FIG. 11.
Figure 15:
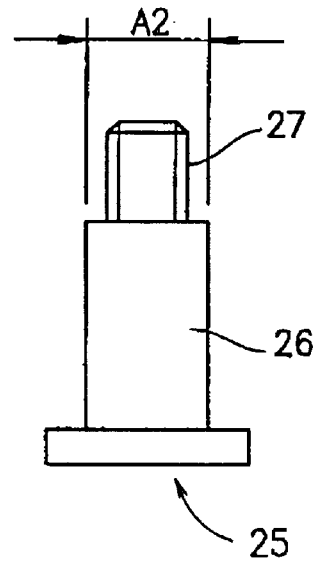
FIG. 15 is a side view of a second attaching screw used to attach the rotation head cylinder to the substrate of the magnetic recording and reproduction apparatus shown in FIG. 11.
Figure 16:
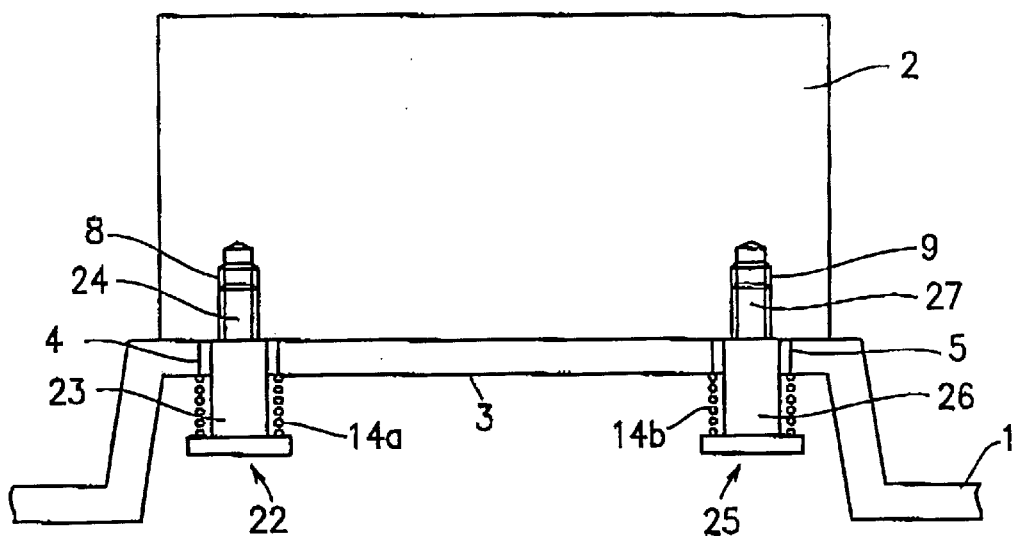
FIG. 16 is a cross-sectional view of the magnetic recording and reproduction apparatus taken along line H—H in FIG. 11.
Figure 17:
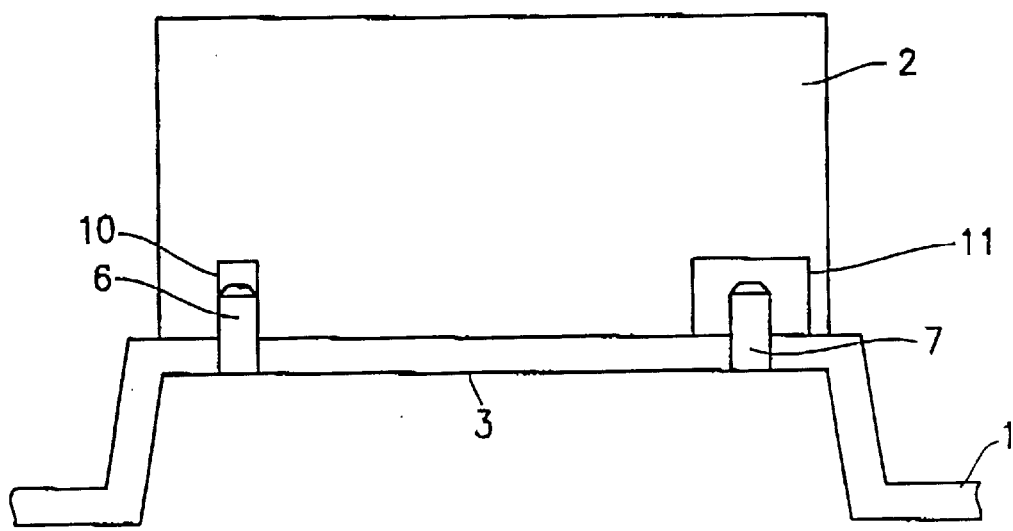
FIG. 17 is a cross-sectional view of the magnetic recording and reproduction apparatus taken along line I—I in FIG. 11.

FIG. 10 is a cross-sectional view of the magnetic recording and reproduction apparatus 300 taken along line G—G in FIG. 7. In FIGS. 7 and 10, identical elements previously discussed with respect to FIGS. 1, 2, 3 and 6 bear identical reference numerals thereto and the detailed descriptions thereof will be omitted.

As shown in FIG. 10, the rotation head cylinder 2 is attached to the substrate 1 via a first attaching screw 28 inserted into the first positioning engagement hole 20 of the substrate 1 and a second attaching screw 30 inserted into the second positioning engagement hole 21 of the substrate 1.

Figure 8:
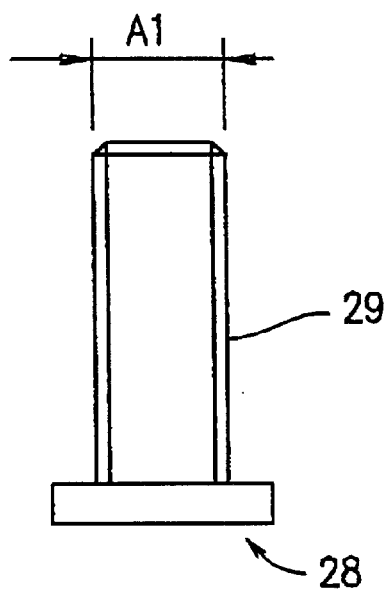
FIG. 8 is a side view of a first attaching screw used to attach a rotation head cylinder to a substrate of the magnetic recording and reproduction apparatus shown in FIG. 7.
Figure 9:
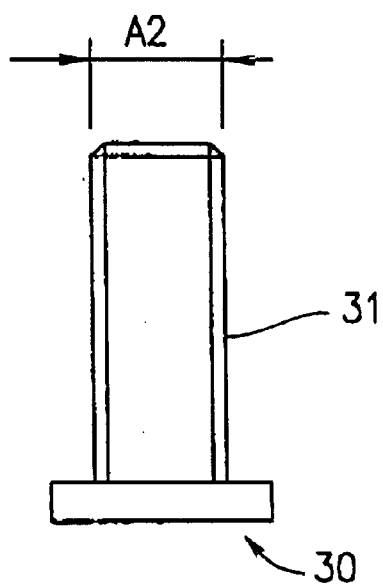
FIG. 9 is a side view of a second attaching screw used to attach the rotation head cylinder to the substrate of the magnetic recording and reproduction apparatus shown in FIG. 7.

FIG. 8 is a side view of the first attaching screw 28. The first attaching screw 28 includes a (first) male screw 28 having a diameter A1. FIG. 9 is a side view of the second attaching screw 30. The second attaching screw 30 includes a (second) male screw 31 having a diameter A2. The first and second male screws 29 and 31 respectively correspond to first and second cylindrical sections of the first and second attaching screws 28 and 30.

Returning to FIG. 10, the first male screw 29 of the first attaching screw 28 is inserted into the first positioning engagement hole 20 of substrate 1 and is engaged with the first female screw 8 of the rotation head cylinder 2. A coil spring 14a, interposed between a head of the first attaching screw 28 and the substrate 1, loads the first attaching screw 28 in such a direction as to pressure-contact the rotation head cylinder 2 to the substrate 1. Likewise, the second male screw 31 of the second attaching screw 30 is inserted into the second positioning engagement hole 21 of the substrate 1 and is engaged with the second female screw 9 of the rotation head cylinder 2. A coil spring 14b, interposed between a head of the second attaching screw 30 and the substrate 1, loads the second attaching screw 30 in such a direction as to pressure-contact the rotation cylinder 2 to the substrate 1.

Tables 1 and 2 shown above regarding the magnetic recording and reproduction apparatus 200 in the first example are also applicable to the magnetic recording and reproduction apparatus 300 in the second example.

The relationships of $0 \leq B1-A1 \leq 0.0002$ and $0 \leq B2-A2 \leq 0.0002$ result in the evaluation of "poor" linearity of the running locus. The reason is that the clearance between the first male screw and the first positioning engagement hole, and the clearance between the second male screw and the second positioning engagement hole, are each too small to allow the first and second male screws to respectively pass through the positioning engagement holes.

The relationships of $0.1 \leq B1-A1 \leq 0.2$ and $0.1 \leq B2-A2 \leq 0.2$ also result in the evaluation of "poor" linearity of the running locus. The reason is that too high a positioning error of the rotation head cylinder on the substrate results, and as such, the linearity of the locus exceeds 0.003 mm as set by the DV Standards. Accordingly, A1, A2, B1 and B2 are set to have the following relationships.

$$0.0002 \text{ mm} < B1-A1 < 0.1 \text{ mm}$$

$$0.0002 \text{ mm} < B2-A2 < 0.1 \text{ mm}$$

Due to such relationships of A1, A2, B1 and B2, the magnetic recording and reproduction apparatus 300 according to the second example of the present invention includes a rotation head cylinder which is positioned with respect to the substrate of the apparatus with a sufficiently high level of precision to provide reliable operation without requiring dedicated positioning pine or dedicated positioning holes as is conventional.

In the first and second examples, only two attaching members (e.g., the attaching screws) and only two holes (e.g., positioning engagement holes) are used for attaching the rotation head cylinder to the substrate. In addition to this, the substrate may have another (third) attaching hole into which another (third) attaching screw is inserted. In this case, a cylindrical section of the additional attaching screw and attaching hole need to have a clearance equal to or greater than 0.1 mm, so that the provision of the additional attaching screw and attaching hole does not influence the positioning precision of the rotation head cylinder to the substrate based on the diameter relationships of the other two attaching screws and attaching holes.

In the first and second examples, coil springs are used to attach the rotation head cylinder to the substrate via the first and second attaching screws. Alternatively, the rotation head cylinder may be attached to the substrate via the first and second attaching screws without using the coil springs.

The rotation head cylinder and the substrate may be easily assembled together by forming an assembly hole in a bottom surface of the rotation head cylinder and providing an assembly projection on the substrate which is inserted into the assembly hole. The assembly hole and the assembly projection need to have a clearance equal to or greater than 0.1 mm, so that the provision of the assembly hole and assembly protection does not influence the positioning precision of the rotation head cylinder to the substrate based on the diameter relationships of the two attaching screws and attaching holes.

As described above, according to the present invention, the relationship between the diameter of a first positioning engagement hole and the diameter of the cylindrical section of an attaching screw, which is to be engaged with the first positioning engagement hole, and the relationship between the width of a second positioning engagement hole and the diameter of the cylindrical section of an attaching screw, which is to be engaged with the second positioning engagement hole, are appropriately defined so as to provide precise positioning of the rotation head cylinder on the substrate for reliable operation. Therefore, the rotation head cylinder can be attached to the substrate with a high level of precision without providing dedicated positioning pine on the substrate or forming dedicated positioning holes in the rotation head cylinder.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording and reproduction apparatus for recording and reproducing a signal to and from a magnetic tape, the magnetic recording and reproduction apparatus comprising:

a substrate having a first positioning engagement hole and a second positioning engagement hole;

a rotation head cylinder provided on the substrate and having the magnetic tape wound therearound over a prescribed angle, the rotation head cylinder having a first female screw and a second female screw;

a first attaching screw having a first cylindrical section for insertion into the first positioning engagement hole and engagement with the first female screw; and a second attaching screw having a second cylindrical section for insertion into the second positioning engagement hole and engagement with the second female screw, wherein the first cylindrical section has a diameter A1, the first positioning engagement hole has a diameter B1, the second cylindrical section has a diameter A2, and the second positioning engagement hole has a width B2, and A1, A2, B1 and B2 fulfill the following relationships:

$$0.0002 \text{ mm} < B1-A1 < 0.1 \text{ mm},$$

and $$0.0002 \text{ mm} < B2-A2 < 0.1 \text{ mm}.$$

2. A magnetic recording and reproduction apparatus according to claim 1, wherein one of the first and second positioning engagement holes is circular and the other of the first and second positioning engagement holes is substantially slot-shaped.

3. A magnetic recording and reproduction apparatus according to claim 1, further comprising a third attaching screw for insertion into a third positioning engagement hole of the substrate.

4. A magnetic recording and reproduction apparatus according to claim 3, wherein the third attaching screw has a clearance equal to or greater than 0.1 mm when inserted into the third positioning engagement hole.

5. A magnetic recording and reproduction apparatus according to claim 1, wherein a first coil spring is provided between a head of the first attaching screw and the substrate and a second coil spring is provided between a head of the second attaching screw and the substrate, the first and second coil springs respectively loading the first and second attaching screws in a direction so as to pressure-contact the rotation head cylinder to the substrate.

6. A magnetic recording and reproduction apparatus according to claim 1, wherein the substrate further has an assembly projection for insertion into an assembly hole of the rotation head cylinder.

7. A magnetic recording and reproduction apparatus according to claim 6, wherein the assembly projection has a clearance equal to or greater than 0.1 mm when inserted into the assembly hole.

8. A magnetic recording and reproduction apparatus for recording and reproducing a signal to and from a magnetic tape, the magnetic recording and reproduction apparatus comprising:

a substrate having a first positioning engagement hole and a second positioning engagement hole;

a rotation head cylinder provided on the substrate and having the magnetic tape wound therearound over a prescribed angle, the rotation head cylinder having a first female screw and a second female screw;

a first attaching screw having a first male screw for insertion into the first positioning engagement hole and engagement with the first female screw; and a second attaching screw having a second male screw for insertion into the second positioning engagement hole and engagement with the second female screw, wherein the first male screw has a diameter A1, the first positioning engagement hole has a diameter B1, the male screw has a diameter A2, and the second positioning engagement hole has a width B2, and A1, A2, B1 and B2 fulfill the following relationships:

$$0.0002 \text{ mm} < B1-A1 < 0.1 \text{ mm},$$

and $$0.0002 \text{ mm} < B2-A2 < 0.1 \text{ mm}.$$

9. A magnetic recording and reproduction apparatus according to claim 8, wherein one of the first and second positioning engagement holes is circular and the other of the first and second positioning engagement holes is substantially slot-shaped.

10. A magnetic recording and reproduction apparatus according to claim 8, further comprising a third attaching screw for insertion into a third positioning engagement hole of the substrate.

11. A magnetic recording and reproduction apparatus according to claim 10, wherein the third attaching screw has a clearance equal to or greater than 0.1 mm when inserted into the third positioning engagement hole.

12. A magnetic recording and reproduction apparatus according to claim 8, wherein a first coil spring is provided between a head of the first attaching screw and the substrate and a second coil spring is provided between a head of the second attaching screw and the substrate, the first and second coil springs respectively loading the first and second attaching screws in a direction so as to pressure-contact the rotation head cylinder to the substrate.

13. A magnetic recording and reproduction apparatus according to claim 8, wherein the substrate further has an assembly projection for insertion into an assembly hole of the rotation head cylinder.

14. A magnetic recording and reproduction apparatus according to claim 13, wherein the assembly projection has a clearance equal to or greater than 0.1 mm when inserted into the assembly hole.

* * * * *